United States Patent [19]

Fujimoto et al.

[11] Patent Number: 4,731,424

[45] Date of Patent: Mar. 15, 1988

[54] PROCESS FOR PRODUCING POLYMER COMPOUND CONTAINING ALKENYLSILYL GROUP

[75] Inventors: Teruo Fujimoto; Mikio Shiono; Osamu Watanabe, all of Nagaoka; Koichi Ito, Higashikurume, all of Japan

[73] Assignee: Shin-Etsu Chemical Co., Ltd., Tokyo, Japan

[21] Appl. No.: 25,640

[22] Filed: Mar. 13, 1987

[30] Foreign Application Priority Data

Mar. 14, 1986 [JP] Japan ................................ 61-057960

[51] Int. Cl.[4] .......................... C08F 4/46; C08F 30/08

[52] U.S. Cl. .................................... 526/180; 526/194; 526/204; 526/220; 526/279

[58] Field of Search ............... 526/220, 194, 204, 279, 526/180

[56] References Cited

U.S. PATENT DOCUMENTS 4,636,454 1/1987 Fujimoto et al. .................. 526/279

FOREIGN PATENT DOCUMENTS 59-53516 3/1984 Japan .................................. 526/279
59-53506 3/1984 Japan .................................. 526/279
60-84310 5/1985 Japan .................................. 526/279
61-27537 2/1986 Japan .................................. 526/279

OTHER PUBLICATIONS

45-Synthetic High Polymers-1964-10782 c, d, e, f.

*Primary Examiner*—Joseph L. Schofer
*Assistant Examiner*—N. Sarofim
*Attorney, Agent, or Firm*—Schwartz, Jeffery, Schwaab, Mack, Blumenthal & Evans

[57] ABSTRACT

A process for producing an alkenylsilyl group-containing polymer compound, comprising polymerizing a vinyl monomer compound containing an alkenylsilyl group-containing styrene compound represented by General Formula (I):

$$CH_2{=}CR^1-C_6H_4-Si(R^2)(R^3)\text{+}CH_2\text{+}_n CH{=}CH_2 \quad (I)$$

wherein $R^1$ represents hydrogen atom, methyl group or ethyl group; $R^2$ and $R^3$ may be the same or different and each represent an alkyl group having 1 to 3 carbon atoms or phenyl group; and n is an integer of 0 to 4, by using an organic metallic compound as an initiator, wherein the polymerization is carried out in the presence of N-methylpyrrolidine.

There can be obtained a monodisperse alkenylsilyl group-containing high molecular compound in which only the unsaturated bond in the styrene moiety of the compound of Formula (I) has been predominantly polymerized.

9 Claims, 2 Drawing Figures

PROCESS FOR PRODUCING POLYMER COMPOUND CONTAINING ALKENYLSILYL GROUP

BACKGROUND OF THE INVENTION

1. Field of the Invention

This invention relates to an alkenylsilyl group-containing polymer compound which is useful as a variety of functional materials including a resist material.

2. Description of Prior Art

Known is process in which a styrene compound containing an alkenylsilyl group is polymerized in a hydrocarbon solvent such as benzene and toluene or a polar solvent such as tetrahydrofuran and dioxane by using an organic metallic compound such as n-butyl lithium and cumyl potassium as an initiator (see K. Matsumura et al., POLYMER PREPRINTS JAPAN, 33[2], 153(1984)).

In general, it is required for polymer materials used in resist materials or the like to be highly monodispersed in molecular weight distribution. However, according to the polymerization process mentioned above, not only the vinyl group in a styrene moiety but also the vinyl group contained in an alkenylsilyl group may participate in the polymerization reaction, whereby a resulting polymer may be of low monodispersion, disadvantageously. It is also disadvantageous that there are required complicated steps for fractionation and the like in order to separate from the polymerized product thus obtained a monodisperse alkenylsilyl group-containing polymer compound in which only the vinyl group in the styrene moiety has been predominantly polymerized.

SUMMARY OF THE INVENTION

Accordingly, an object of this invention is to provide a process for polymerizing an alkenylsilyl group-containing styrene compound, wherein the monodisperse alkenylsilyl group-containing polymer compound can be obtained by predominantly polymerizing only the vinyl group in the styrene moiety and allowing the alkenylsilyl group to remain unreacted.

The present inventors have found that the above object can be achieved by allowing N-metylpyrrolidine to be present in the reaction system together with an organic metallic compound when the alkenylsilyl group-containing styrene compound is polymerized.

This invention provides a process for producing an alkenylsilyl group-containing polymer compound, comprising polymerizing a vinyl monomer compound comprising an alkenylsilyl group-containing styrene compound represented by General Formula (I):

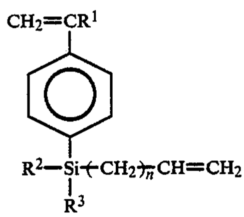

(I)

Wherein $R^1$ represents hydrogen atom, methyl group or ethyl group; $R^2$ and $R^3$ may be the same or different and each represent an alkyl group having 1 to 3 carbon atoms or phenyl group; and n is an integer of 0 to 4, by using an organic metallic compound as an initiator, wherein the production process is characterized in that the above polymerization is carried out in the presence of N-methylpyrrolidine.

According to the production process of this invention, it is possible to obtain a monodispirse alkenylsilyl group-containing polymer compound in which the vinyl group in the alkenylsilyl group remains unreacted and only the vinyl group in the styrene moiety has been predominantly polymerized. The polymer compound obtained is useful as a negative type resist material, or can be useful as an intermediate of various high molecular materials by utilizing the reactivity of the side chain vinyl group.

DETAILED DESCRIPTION OF THE INVENTION

Figure 1:
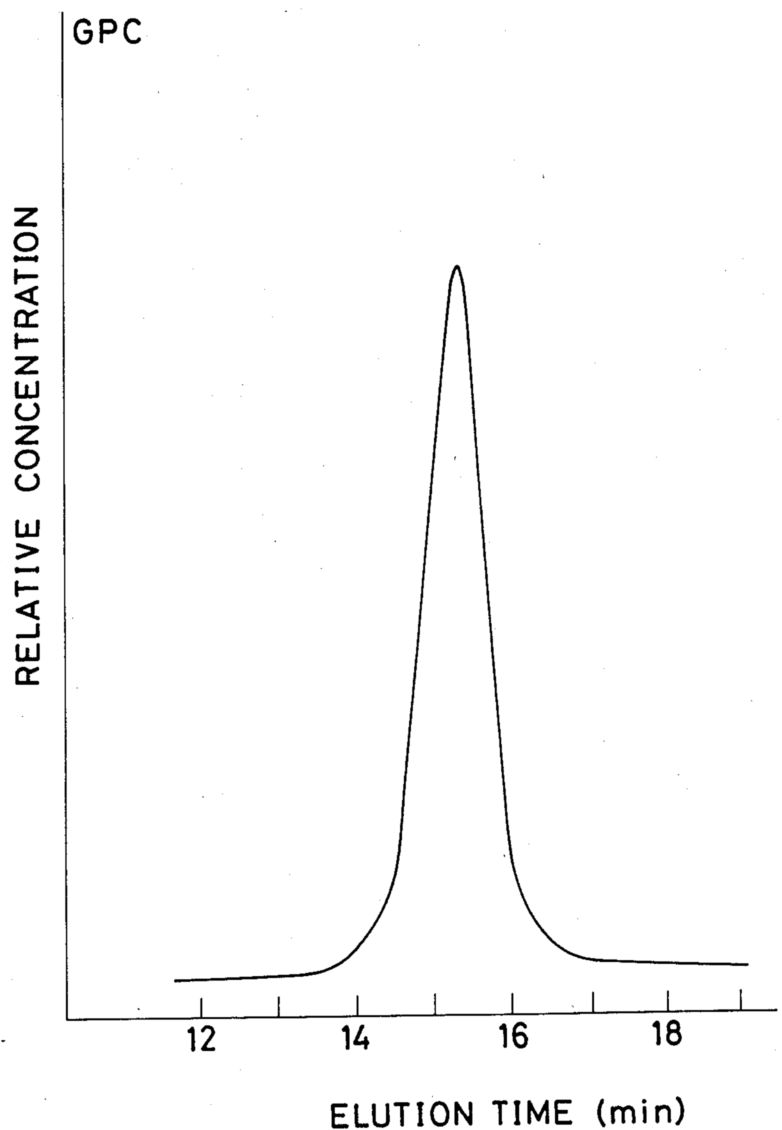
FIG. 1 shows an elution curve by gel permeation chromatography (GPC) on an alkenylsilyl group-containing high molecular compound obtained in Example 1 in accordance with this invention.

The vinyl monomer compound used in the process of this invention may comprise only the styrene compound of General Formula (I), or may comprise the compound of General Formula (I) and other polymerizable vinyl monomer compound.

Examples of the alkenylsilyl group-containing styrene compound represented by General Formula (I) may include 4-vinylphenyldimethylvinylsilane, 4-vinylphenyldimethylallylsilane, 4-vinylphenyldimethyl-1-butenylsilane, 4-(1-methylethenyl)phenyldimethylvinylsilane, 4-(1-methylethenyl)phenyldimethylallylsilane, and the like. These can be used alone or in combination.

Also, the polymerizable vinyl monomer compounds that can be optionally used as a comonomer in combination with the styrene compound of General Formula (I) may include, for example, vinyl aromatic hydrocarbon compounds such as styrene and $\alpha$-methylstyrene; acrylic or methacrylic acid esters such as methyl methacrylate, methyl acrylate and ethyl acrylate; dienes such as butadiene and isoprene; and the like.

The organic metallic compounds used as an initiator may include, for example, organic alkali metals such as cumyl cesium, cumyl potassium, benzyl sodium and benzyl potassium, and particularly preferable is cumyl cesium. The amount of the organic metallic compound used may be varied depending on the amount of charged monomers and the desired molecular weight of a polymer to be produced, and may be in the range of concentration of the order of $10^{-4}$ to $10^{-2}$ mol/lit. in a reaction mixture.

The N-methylpyrrolidine used in this invention is preferably used in the range of an equimolar to 10 time molar amount based on the initiator.

The polymerization in this invention is, in general, carried out in an organic solvent, and the organic solvents to be used may include ether type solvents such as tetrahydrofuran, dioxane, tetrahydropyran, dimethoxyethane and diglyme, and particularly preferable is tetrahydrofuran. These solvents can be used singly or in combination of two or more of them.

The monomer compound used in the polymerization may be preferably in an concentration of 1 to 10% by weight in the reaction mixture, and the reaction may be preferably carried out under stirring at a temperature of $-78°$ to $-20°$ C. under high vacuum of $10^{-5}$ Torr or less or in an atmosphere of an inert gas such as argon and nitrogen. Usually, the polymerization is carried out for about 10 minutes to 1 hour, and thereafter a terminator such as methanol and ethyl bromide is added to the reaction system to stop the reaction, whereby the desired alkenylsilyl group-containing polymer compound can be obtained. The resulting polymer compound can be purified and separated by subjecting a reaction mixture containing the product to precipitation and washing with use of methanol, followed by drying.

The high molecular compound thus obtained is monodispersed in respect of molecular weight distribution, wherein, among two ethylenically unsaturated groups contained in the styrene compound of General Formula (I), only the unsaturated group in the styrene moiety has been predominantly polymerized, and the vinyl group in the alkenylsilyl group remains unreacted, and which has a structural unit represented by General Formula:

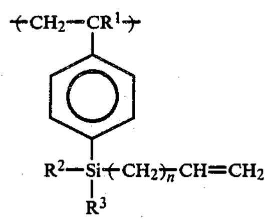

wherein $R^1$, $R^2$, $R^3$ and n are as defined above.

Yield of the polymer compound produced is substantially 100% based on the monomer compound used for the reaction, and the molecular weight thereof can be readily calculated from the weight of the monomer compounds used and the mole number (or number of molecules) of the initiator. Also, number average molecular weight ($\overline{Mn}$) can be measured using a membrane osmometer, and judgement on whether a desired product has been formed or not can be made based on infrared (IR) spectrum and $^1$H-NMR. Evaluation on the molecular weight distribution can be also made by gel permeation chromatography (GPC).

According to the process of this invention, it is possible to readily produce the polymer compound having a polymerization degree of about 10 to 5,000.

EXAMPLES

This invention will be described below in greater detail with reference to Examples.

EXAMPLE 1

Polymerization of 4-vinylphenyldimethylvinylsilane in the presence of N-methylpyrrolidine A 500 ml flask was charged with 209 ml of tetrahydrofuran as a solvent, $1.08\times10^{-4}$ mole of cumyl cesium as an initiator and $6.45\times10^{-4}$ mole of N-methylpyrrolidine as an additive under a high vacuum of $10^{-6}$ Torr. To the resulting mixed solution, at $-78°$ C., 11.5 ml of vinylphenyldimethylvinylsilane diluted with 91 ml of tetrahydrofuran was added and polymerized for 15 minutes, with the result that the mixed solution turned red. To the reaction mixture, 2 ml of methanol was added to stop the polymerization, and thereafter the reaction mixture was poured into methanol to precipitate the polymer formed and separate the same, followed by drying to obtain 10.3 g of a white polymer.

IR spectrum and $^1$H-NMR of the resulting polymer were measured to find that it showed the characteristic absorption as set out below, and the GPC elution curve is as shown in FIG. 1.

IR ($cm^{-1}$): 820,1250 ($Si(CH_3)_2$), (1600 ($SiCH{=}CH_2$)).

$^1$H-NMR (ppm,δ): 0.27($Si(CH_3)_2$); 5.8, 6.0 ($SiCH{=}CH_2$).

From IR and $^1$H-NMR, it was confirmed that only the vinyl group in the styrene moiety of the monomer was polymerized and the vinyl group in the vinylsilyl group remained unpolymerized. Also, this polymer had $\overline{Mn}$ of $9.4\times10^4$, and, from the elution curve by GPC, was found to be a very highly monodisperse polymer.

COMPARATIVE EXAMPLE 1

Figure 2:
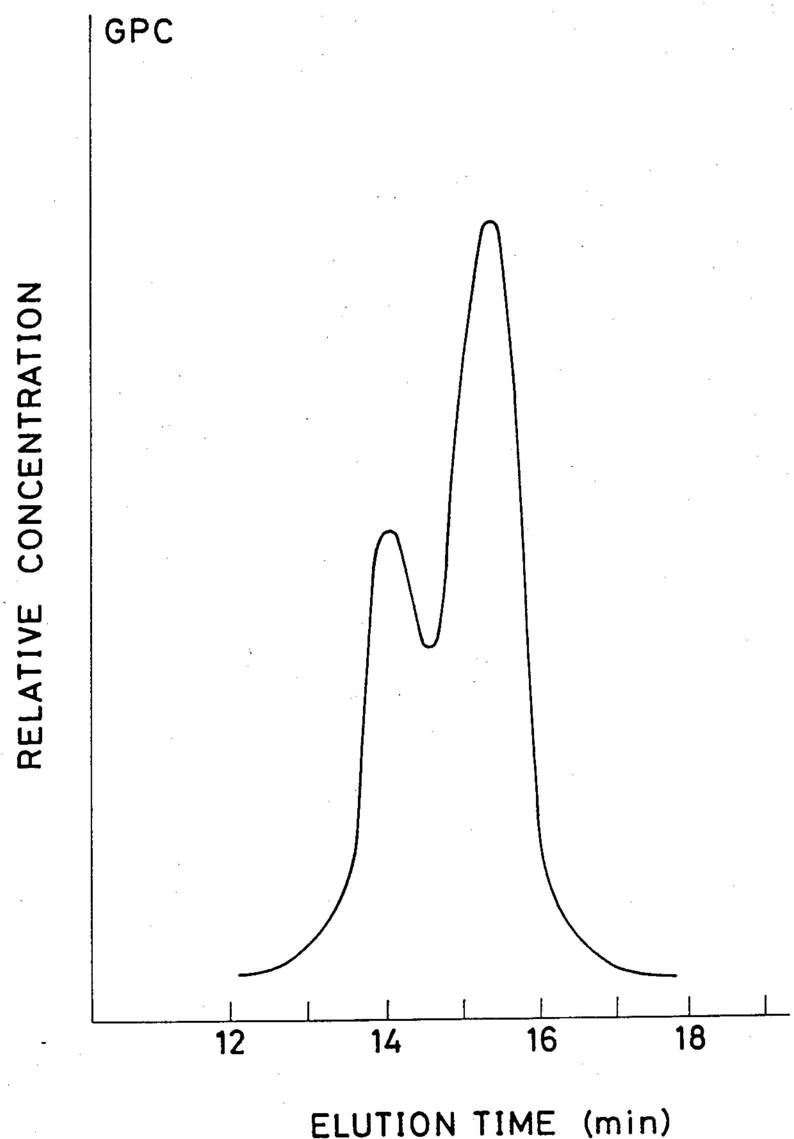
FIG. 2 shows a GPC elution curve on a polymer obtained in Comparative Example 1 in accordance with a conventional process.

Polymerization of 4-vinylphenyldimethylvinylsilane in the presence of cumyl cesium A 500 ml flask was charged with 220 ml of tetrahydrofuran as a solvent and $8.62\times10^{-4}$ mole of cumyl cesium as an initiator under a high vacuum of $10^{-6}$ Torr. To the resulting mixed solution, at $-78$ ° C., 12 ml of 4-vinylphenyldimethylvinylsilane diluted with 90 ml of tetrahydrofuran was added and polymerized for 60 minutes under stirring. To the reaction mixture, 3 ml of methanol was added to stop the polymerization, and thereafter the reaction mixture was poured into methanol to precipitate the polymer formed and separate the same, followed by drying to obtain 10.8 g of a white polymer. GPC elution curve of the resulting polymer is shown in FIG. 2.

What we claim is:

1. A process for producing an alkenylsilyl group-containing polymer compound, comprising polymerizing a vinyl monomer compound comprising an alkenylsilyl group-containing styrene compound represented by General Formula (I):

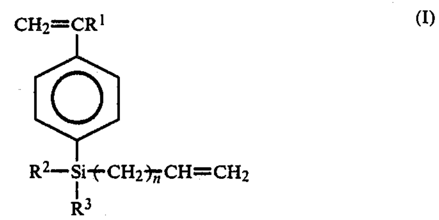

wherein $R^1$ represents hydrogen atom, methyl group or ethyl group; $R^2$ and $R^3$ may be the same or different and each represent an alkyl group having 1 to 3 carbon atoms or phenyl group; and n is an integer of 0 to 4, by using an organic metallic compound as an initiator, wherein the polymerization is carried out in the presence of N-methylpyrrolidine.

2. The process according to claim 1, wherein said alkenylsilyl group-containig styrene compound is at least one compound selected from the group consisting of 4-vinylphenyldimethylvinylsilane, 4-vinylphenyldimethylallylsilane, 4-vinylphenyldimethyl-1-butenylsilane, 4-(1-methylethenyl)phenyldimethylvinylsilane and 4-(1-methylethenyl)phenyldimethylallylsilane.

3. The process according to claim 1, wherein said organic metallic compound is an organic alkali metal.

4. The process according to claim 3, wherein said organic alkali metal is cumyl cesium.

5. The process according to claim 1, wherein the polymerization is carried out in an ether type solvent.

6. The process according to claim 1, wherein the polymerization is carried out at $-78°$ to $-20°$ C. under high vacuum of not more than $10^{-5}$ Torr.

7. The process according to claim 1, wherein the polymerization is carried out at $-78°$ to $-20°$ C. in an atmosphere of an inert gas.

8. The process according to claim 1, wherein in the polymerization system said vinyl monomer compound is in concentration of 1 to 10% by weight and said organic metallic compound is in concentration of the order of $10^{-4}$ to $10^{-2}$ mole/lit.

9. The process according to claim 1, wherein in the polymerization system said N-methylpyrrolidine is in concentration of an equimolar to 10 time molar amount based on said organic metallic compound.

* * * * *